(12) United States Patent
Natale et al.

(10) Patent No.: US 8,167,492 B2
(45) Date of Patent: May 1, 2012

(54) LUBRICATING DEVICE FOR A LINEAR ROLLING BEARING

(75) Inventors: Mario Natale, Bechhofen (DE); Martin Menges, Homburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 231 days.

(21) Appl. No.: 12/532,482

(22) PCT Filed: Mar. 19, 2008

(86) PCT No.: PCT/EP2008/053274
§ 371 (c)(1),
(2), (4) Date: Dec. 10, 2009

(87) PCT Pub. No.: WO2008/116805
PCT Pub. Date: Oct. 2, 2008

(65) Prior Publication Data
US 2010/0111454 A1 May 6, 2010

(30) Foreign Application Priority Data

Mar. 23, 2007 (DE) .......................... 10 2007 013 945

(51) Int. Cl.
*F16C 33/10* (2006.01)
(52) U.S. Cl. .................. 384/13; 384/15; 384/45
(58) Field of Classification Search ................ 384/13, 384/15, 43–45
See application file for complete search history.

(56) References Cited

U.S. PATENT DOCUMENTS

| | | | | |
|---|---|---|---|---|
| 4,582,369 A | * | 4/1986 | Itoh | 384/13 |
| 4,850,720 A | * | 7/1989 | Osawa | 384/13 |
| 5,139,347 A | * | 8/1992 | Hattori | 384/15 |
| 5,496,113 A | * | 3/1996 | Winkelmann et al. | 384/13 |
| 5,727,884 A | * | 3/1998 | Greiner et al. | 384/45 |
| 6,203,199 B1 | * | 3/2001 | Pfeuffer | 384/45 |
| 6,290,394 B1 | * | 9/2001 | Obara et al. | 384/13 |
| 6,729,760 B2 | * | 5/2004 | Mochizuki et al. | 384/45 |
| 7,435,000 B2 | * | 10/2008 | Neufang et al. | 384/45 |
| 7,604,408 B2 | * | 10/2009 | Dorn et al. | 384/45 |
| 7,798,716 B2 | * | 9/2010 | Haub | 384/13 |
| 2002/0134622 A1 | | 9/2002 | Michioka et al. | |
| 2002/0181810 A1 | * | 12/2002 | Menges et al. | 384/45 |
| 2003/0164264 A1 | * | 9/2003 | Luo | 184/5 |
| 2004/0234176 A1 | * | 11/2004 | Sattler et al. | 384/13 |

(Continued)

FOREIGN PATENT DOCUMENTS

DE 41 41 038 Y 6/1993

(Continued)

*Primary Examiner* — Marcus Charles
(74) *Attorney, Agent, or Firm* — Lucas & Mercanti, LLP; Klaus P. Stoffel

(57) ABSTRACT

A lubricating device for a linear rolling bearing which has a guide rail and a carriage that is longitudinally moveable on the guide rail and supported on the guide rail by rolling bodies. The rolling bodies are guided in longitudinal grooves along the guide rail, and the lubricating device is fastened to the carriage and lubricate the longitudinal grooves and/or the rolling bodies. The lubricating device also has lubricant supply ducts, which supply a lubricant to the longitudinal grooves and clear outlet openings in the region of the longitudinal grooves for transferring the lubricant to the longitudinal grooves. The lubricant supply ducts are covered by at least one absorbent repository element along the courses thereof in coverage areas. The repository element is designed and/or arranged to absorb lubricant in the coverage areas and to conduct it to the longitudinal grooves in parallel with the lubricant supply channels.

15 Claims, 3 Drawing Sheets

U.S. PATENT DOCUMENTS

| | | | |
|---|---|---|---|
| 2005/0201644 A1 * | 9/2005 | Lee et al. | 384/13 |
| 2006/0215943 A1 * | 9/2006 | Agari et al. | 384/13 |
| 2008/0159668 A1 * | 7/2008 | Wu et al. | 384/13 |

FOREIGN PATENT DOCUMENTS

| | | |
|---|---|---|
| DE | 43 95 740 A | 6/1997 |
| DE | 100 26 587 A | 12/2000 |
| DE | 101 36 826 A | 2/2003 |
| DE | 102004031028 A1 * | 1/2006 |
| DE | 10 2006 003 849 A | 3/2007 |
| DE | 102008006819 A1 * | 8/2009 |
| EP | 09 19 738 Y | 6/1999 |
| EP | 09 50 465 Y | 10/1999 |
| EP | 1 760 342 A | 3/2007 |
| EP | 1840396 A2 * | 10/2007 |
| WO | 93/12351 A | 6/1993 |

* cited by examiner

Fig. 1
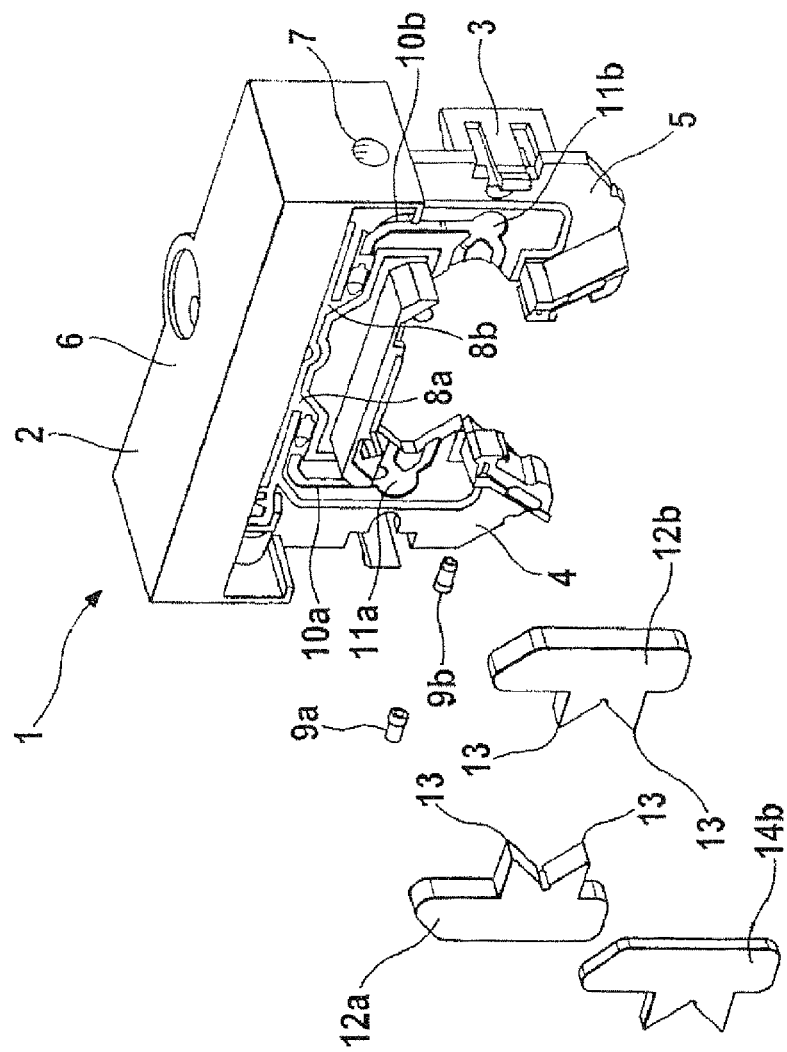
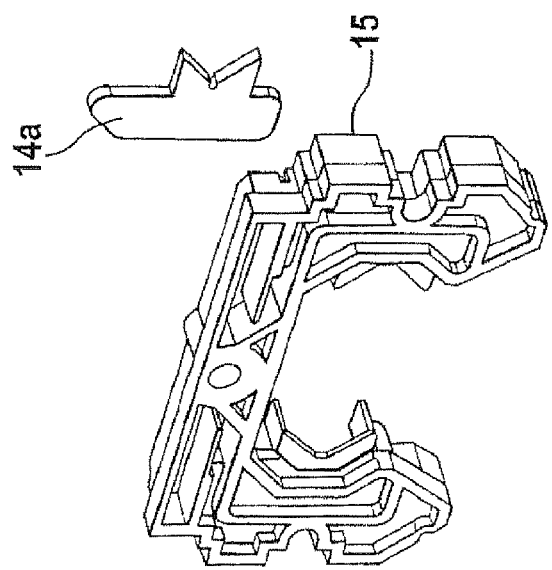

LUBRICATING DEVICE FOR A LINEAR ROLLING BEARING

This application is a 371 of PCT/EP2008/053274 filed Mar. 19, 2008, which in turn claims the priority of DE 10 2007 013 945.6 filed Mar. 23, 2007, the priority of both applications is hereby claimed and both applications are incorporated by reference herein.

FIELD OF THE INVENTION

The invention relates to a lubricating device for a linear rolling bearing, the linear rolling bearing having a guide rail and a guide carriage which is displaceable longitudinally on the guide rail and which is supported on the guide rail via rolling bodies which are guided along the guide rail in longitudinal grooves of the guide rail, and the lubricating device being designed to be fastened to the guide carriage and for lubricating the longitudinal grooves and/or the rolling bodies, with lubricant supply ducts which are designed to supply lubricant to the longitudinal grooves and which have on the end face, in the region of the longitudinal grooves, free outlet passages for the transfer of the lubricant to the longitudinal grooves.

BACKGROUND OF THE INVENTION

Lubricating devices of this type are used in order, in linear rolling bearings, to separate or lubricate the contact zones between the running surfaces in the guide carriage, the loaded rolling bodies and the longitudinal grooves as running countersurfaces. In conventional systems, a plurality of transfer points, such as, for example, lubricating nipples, are provided for receiving the lubricants. The lubricant, starting from the lubricating nipples, arrives via a system of ducts at the rolling bodies, the running surfaces or the running countersurfaces.

Patent application publication DE 198 451 81 A1 describes, for example, a lubricating device for a linear rolling bearing, said lubricating device comprising an oil tank which via oil dispensers, as they are known, conveys the lubricant to the raceways of the rolling bodies. The oil dispensers in this case are formed from a fibrous or porous material which touches the rolling body raceways of the guide rail and wets them with the lubricant.

Another type of lubricant supply is proposed in patent application publication DE 198 285 87 A1 which likewise relates to a linear guide device with permanent lubrication. To supply the rolling bodies with lubricant, a lubricant supply hole is provided in the direction reversal aisles which ensure an endless circulation of the rolling bodies, said lubricant supply hole making it possible to supply the rolling bodies with lubricant directly.

The publication U.S. Pat. No. 5,494,354, which is considered to be the nearest prior art, treats a linear guide device with a lubricating device which has an inner space for receiving the lubricant, which inner space can be filled via a lubricating nipple and supplies the running surfaces with the lubricant via open ducts.

SUMMARY OF THE INVENTION

The object on which the invention is based is to propose a lubricating device for a linear rolling bearing, said lubricating device ensuring sufficient and at the same time economical lubrication.

The lubricating device according to the invention is suitable and/or designed for a linear rolling bearing, the linear rolling bearing having a guide rail and a guide carriage displaceable longitudinally on the guide rail. The guide carriage is supported on the guide rail via rolling bodies, the rolling bodies preferably being designed as balls or rollers. The rolling bodies are guided along the guide rail in longitudinal grooves of the guide rails, so that the guide carriage can roll along the guide rail via the rolling bodies. The rolling bodies are preferably guided in the manner of a ring in the guide carriage, so that they can perform an endless circulation in the guide carriage.

The lubricating device is designed to be fastened to the guide carriage and at the same time for lubricating the longitudinal grooves and/or the rolling bodies. Lubrication takes place via a liquid or viscous lubricant, such as, for example, a lubricating oil or a lubricating grease.

The lubricating device has lubricant supply ducts which are designed to supply the lubricant to the longitudinal grooves of the guide rails and which have on the end face, in the region of the longitudinal grooves, a free outlet passage for the transfer of the lubricant to the longitudinal grooves, and in this case the lubricant can traverse the outlet passage without obstruction. In particular, no further materials are arranged in the free outlet passage.

According to the invention, the lubricant supply ducts are covered along their run, in a covering region, by at least one absorbent repository element which is designed and/or arranged to take up lubricant in the covering region and to conduct, guide and/or transfer said lubricant, parallel to the lubricant supply duct, to the longitudinal grooves. In this case, there may be provision for each lubricant supply duct to be assigned a specific repository element or for a plurality of or all of the lubricant supply ducts to be assigned one common repository element. The repository element is designed to allow a lubricant to flow from the covering region to the longitudinal grooves fluidically parallel to the lubricant supply ducts, but also, where appropriate, to permit a lubricant flow in the opposite direction. The repository element in any event makes a lubricant-conducting connection between the covering region and the longitudinal grooves of the guide rail.

The invention is based on the notion of implementing multiway lubrication, in particular two-way lubrication, in contrast to the lubricating devices known from the prior art. The lubricating device according to the invention in this case makes it possible for part of the lubricant to arrive directly via the lubricant supply ducts at the longitudinal grooves, that is to say the surface of the rail raceway. A further part of the lubricant is first stored via the covering region in the repository element or repository elements. The respective proportion between direct lubrication and storage can in this case be set by means of the geometric configuration of the lubricant supply ducts, particularly in the covering region. Since the repository element or repository elements is or are likewise in contact with the raceways of the guide rail, it is possible, on the one hand, to transfer stored lubricant in the event of a lack of lubricant on the raceways. On the other hand, if there is an excess of lubricant on the raceways, this can be absorbed by the repository elements and stored as a repository within the element or elements. Further optional advantages of the lubricating device are that a very fine metering of the lubricant supplied becomes possible. Since the excess lubricant supplied is tied up in the repository element or repository elements or is again collected by these and stored, a varying lubricant consumption which is dependent on the degree of load upon the respective raceway is compensated. Moreover, via the lubricating device according to the invention, the lubricant supply is ensured independently of the installation position of the lubricating device and therefore of the guide carriage, while at the same time the lubricant is supplied according to consumption. By virtue of these advantages, markedly longer relubrication intervals, along with markedly smaller lubricant volumes supplied, can be implemented, as compared with the otherwise conventional systems.

In a preferred embodiment, the absorbent repository element is formed from a porous and/or capillary material. For example, porous synthetic resin, polymer material, sintered material, wick material or microcellular rubber may be used. In particular, the material of the repository elements is designed to store the lubricant intermediately and/or to release it with a time delay. The material of the repository elements preferably has the property of compensating regions of different lubricant concentration by means of capillary effects.

In a preferred implementation of the invention, the covering region or covering regions is or are contiguous to a closed region of the lubricant supply ducts and extends or extend, as a duct open to the repository element or repository elements, as far as the free outlet passage or outlet passages. The lubricant supply ducts may therefore be subdivided approximately into two regions, a first region, which is preferably connected to a lubricant stock, being designed as a closed duct, and a second part being implemented as a duct open to the repository element or repository elements.

In especially practical embodiments, the lubricating device has two or four outlet passages, preferably two outlets passages being used when the guide carriage is supported via two rolling body groups, and four outlet passages being used when the guide carriage is supported via four rolling body groups.

In an especially maintenance-friendly embodiment of the invention, nonreturn and/or one-way valves are arranged along the run of the lubricant supply ducts. These valves prevent the lubricating ducts from running empty in the region downstream of the valves in the event of a drop in the lubricating pressure. This affords the advantage that, during a renewed filling of the lubricating device with lubricant, the lubricant supply duct regions arranged fluidically downstream of the valves do not have to be topped up, since they remain filled as a result of the capillary action which is established.

In a development of the invention, the repository elements are covered, at least in portions, in the longitudinal direction of the guide rail, that is to say on the end faces, by means of protective plates. These protective plates serve for protecting the repository elements against soiling. The protective plates may be arranged such that the respective repository element is surrounded partially or even completely. Preferably, the protective plate and the assigned repository element are designed congruently in their marginal contour, at least in the region of the guide rail. In order to protect the lubricating device and/or the guide carriage from dirt particles, the protective plates are preferably formed, at least in portions, from a material which permits or assists an embedding of dirt particles.

In a refinement of the invention, the repository elements have a multiple-ply set-up in the longitudinal direction of the guide rail. Preferably, in this case, there is provision for the individual plies of the repository elements to differ from one another in a varying absorbency. In an alternative embodiment, individual plies of the repository elements and protective plates are arranged in an arbitrary varying sequence or alternately. This affords a multiple layering consisting of repository elements and of protective plates, multiple layerings of repository elements or protective elements also being possible in addition to alternating arrangements.

The material of the protective plates is optionally designed such that lubricant can be stored. In order to control the exchange of lubricant between repository element and protective plate, these are preferably separated from one another completely or else in part regions by means of an additional element. It is generally preferable that the lubricating device is designed such that the repository elements and/or the protective plates are arranged exchangeably.

The lubricating device optionally has one or more actuating means which is or are designed to deform the repository element such that the free cross section of the lubricant supply ducts is modified in the covering region. The material of the repository elements is preferably designed to be elastic, so that it can be partially pressed into the adjacently arranged region of the lubricant supply ducts, its flow cross section being influenced. The volume flow of the lubricant in the lubricant supply ducts can thereby be set by the actuating means. The actuating means can preferably be actuated from outside the lubricating device. In an especially preferred development, the actuating means can be controlled electrically, so that the lubricant flow can be set in an automated manner. In a further development of the invention, each lubricant supply duct and/or each longitudinal groove of the guide rail are/is assigned one of the actuating means. In a design with electrically controllable actuating means, an individually set lubricant quantity can be allocated to each longitudinal groove or to each lubricant supply duct as a result of this assignment and a suitable control, the distribution being selectively controllable or controlled, for example, as a function of the load.

In a development of the invention, the lubricating device has a rolling body deflection which allows an endless circulation of the rolling bodies in the guide carriage, the rolling body deflection preferably being designed as a U-shaped ball track or roller track. In this development, apertures for the transfer of lubricant to the rolling bodies are introduced in the rolling body deflection. The apertures are preferably located at the vertex, in particular at the outer vertex of the rolling body deflection. By means of the apertures, it is possible that the rolling bodies, when circulating, brush directly against the repository element at a contact point and are thereby wetted with lubricant. Alternatively to this, the apertures are designed as free passages, so that lubricant passes, unobstructed, out of the lubricant supply ducts through the apertures to the rolling bodies. As a further alternative, lubricant may pass via the contact point of the repository element and additionally and fluidically in parallel, directly through the lubricant supply ducts under the repository element into the rolling body circulation track. With the nomenclature used above being adopted, there is three-way lubrication. The advantage of the aperture or apertures in the rolling body deflection is that either the rolling bodies are acted upon with additional lubricant or excess lubricant already supplied can be stored in the repository element again via the contact point described above.

In structural terms, the lubricating device is preferably designed as a yoke or a "U", the free legs being dimensioned for surrounding the guide rail. The lubricating device is preferably produced in one piece and comprises, in particular, the rolling body deflection and is placed with its end face onto the guide carriage and fastened positively and/or nonpositively to the latter, for example, via hook elements. The open regions of the lubricant supply ducts are preferably arranged on the end face, in particular on the free end face of the lubricating device.

For a better control of the transfer of lubricant from the lubricant supply ducts to the repository elements, there is preferably provision for the lubricant supply ducts to have a widening in the covering region upstream of each outlet passage and/or upstream of the outlet passages of a leg of the lubricating device, so that the transfer of lubricant can be set geometrically by means of the size of the widening.

Overall, by virtue of the outlined set-up, on the one hand, it is possible to apply the lubricant directly to the raceways by means of the lubricant supply ducts, this being important especially in the case of new guide units with an increased lubricant requirement in the running-in period. On the other hand, the repository element or repository elements is or are wetted with lubricant due to direct contact with the lubricant supply duct. Excess lubricant which has reached the surface of the guide rail directly through the lubricant supply ducts is collected by the repository elements and stored and can therefore be supplied with a time delay.

BRIEF DESCRIPTION OF THE DRAWINGS

Further features and occurrences and the effect of the invention are gathered from the following description of preferred exemplary embodiments of the invention. In the drawing:

FIG. 1 shows a schematic exploded drawing of a lubricating device as an exemplary embodiment of the invention in a three-dimensional illustration;

Parts corresponding to one another are in each case given the same reference symbols in the figures.

DETAILED DESCRIPTION OF THE DRAWINGS

Figure 2:
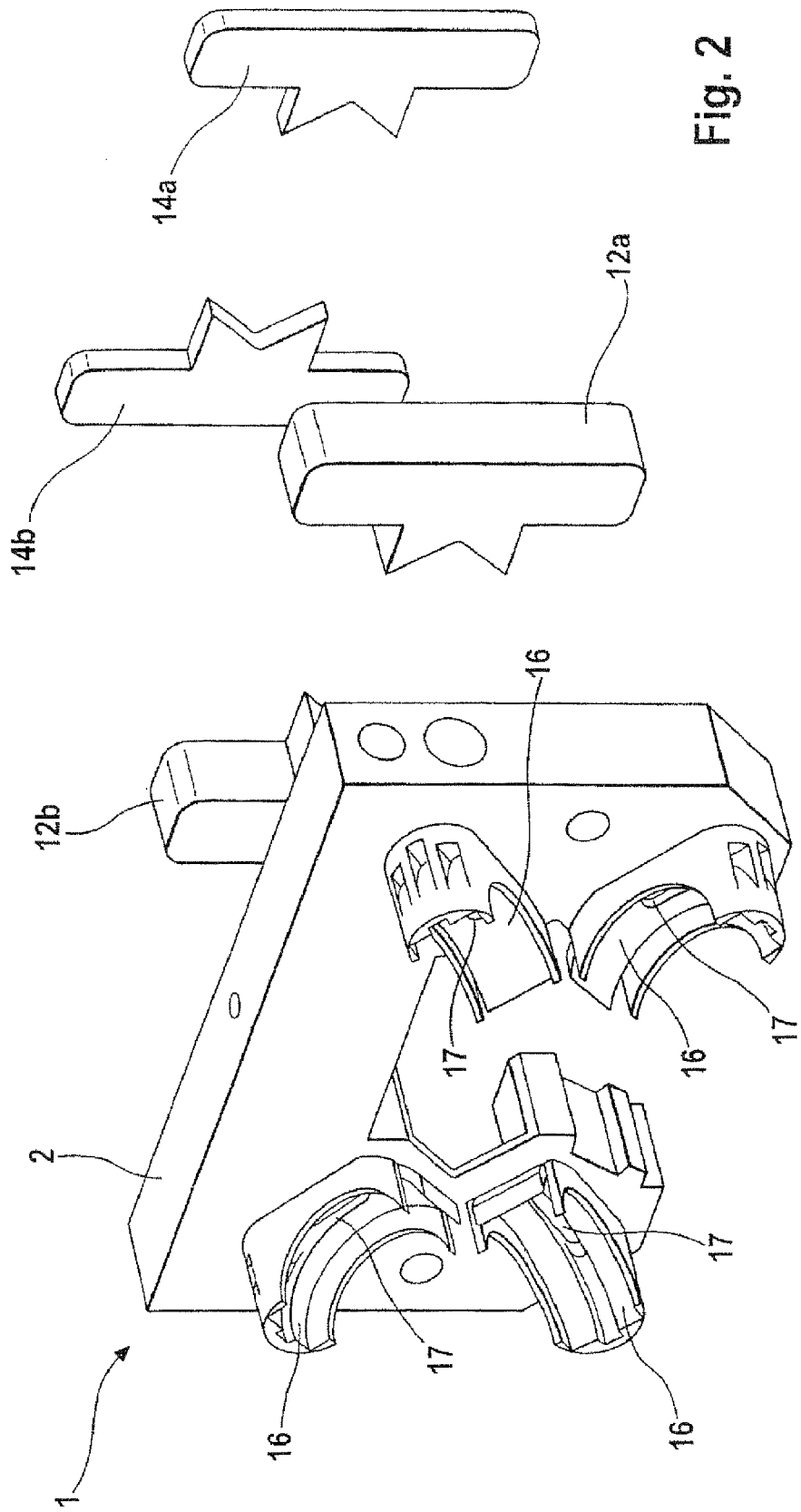
FIG. 2 shows a modified embodiment of the lubricating device in FIG. 1, likewise in a schematic exploded illustration, in a three-dimensional view from the rear side.

FIG. 1 shows, in a three-dimensional illustration, a schematic exploded drawing of a lubricating device 1 comprising a housing 2 which can be fastened by means of fastening devices, in this case clips 3, to a guide carriage, not illustrated, of a linear rolling bearing.

The housing 2 is produced in one piece and is implemented in a U-shaped or yoke-shaped manner with two free legs 4, 5 and with a bridge 6 which connects the two legs 4 and 5. The free space formed by the legs 4 and 5 and bridge 6 is dimensioned such that a guide rail, not illustrated, is surrounded at least in portions.

For the supply of the guide rail, in particular of running grooves of the guide rail for the rolling bodies, the housing 2 has a connecting thread 7 for lubricant delivery lines which are designed, for example, as lubricating nipples. The lubricant is routed from the connecting thread 7 into an optional storage tank in the bridge 6 of the housing 2.

Further along, the lubricant flow is divided into two closed lubricant supply duct portions 8a and 8b which are in each case closed off on the end face by means of a one-way or nonreturn valve 9a and 9b. In the lubricant flow downstream of the valve 9a or 9b, the lubricant supply ducts are designed as channels 10a and 10b which are open on the end face and which first run parallel to the longitudinal extent of the legs 4 and 5 and finally issue in a covering region 11a and 11b of circular design which is likewise open on the end face. In each case two channel-like portions extend from the covering region 11a, 11b, are likewise open on the end face and are also open on the end face to the inner space formed by the legs 4 and 5 and bridge 6.

For the region in which the lubricant supply ducts are designed to be channel-like and open on the end face, a repository element 12a or 12b, respectively, which is designed as a flat plate-like component, is provided for each leg 4 and 5. The repository elements 12a or 12b, respectively, consist in each case of a material which is absorbent and has the property of compensating regions of varying lubricant concentration within the repository elements 12a or 12b, respectively, by means of capillary effects. The contour of the repository elements 12a or 12b, respectively, is adapted to the housing 2, so that these completely cover the channel-like regions, open on the end face, of the lubricant supply ducts. The repository elements 12a or 12b, respectively, have in each case two noses 13 of triangular cross section which are dimensioned such that these engage into the guide grooves of the guide rail, not illustrated, and are in direct contact with the rail raceway.

In the installed state, then, on the one hand, it is possible that, via the lubricant supply ducts which are open at the end face in a channel-like manner, lubricant is transferred directly onto the rail raceways of the running rail via the end-face aperture or, in parallel with this, is first transferred from the channel-like lubricant supply ducts open the end face to the repository elements 12a, 12b, is transported in these to the noses 13 by virtue of the capillary action and is applied by the noses 13 to the surface of the rail raceway. There is therefore effective two-way lubrication. The degree of transfer of lubricant from the lubricant supply ducts to the repository elements is in this case determined by the geometric design of the supply ducts and, in particular, of the covering regions 11a and b. The set-up shown therefore makes it possible to apply lubricant directly onto the raceways of the guide rail by means of the lubricant supply ducts, and on the other hand the repository elements 12a, 12b are impregnated with lubricant as a result of their direct contact with the open lubricant supply ducts. The repository elements 12a or 12b, respectively, have the property of again collecting applied excess lubricant by means of the lubricant supply ducts and storing it and, where appropriate, of supplying it with a time delay, in particular to the raceways of the guide rail.

For securing the repository elements 12a, 12b mechanically, protective plates 14a, 14b are provided which are likewise of plate-shaped design and by their contour are implemented so as to be essentially congruent with the repository elements 12a, 12b. In a preferred embodiment, the material of the protective plates 14a, 14b is designed to bind and/or likewise absorb dirt particles, so that the protective plates 14a, 14b, too, can take up lubricant and, where appropriate, discharge it again with a time delay. The housing 2 is covered by a plate 15 and, where appropriate, closed so as to be liquid-tight. Further seals are, of course, arranged in the housing 2 so as to prevent the lubricant from escaping in an uncontrolled way.

FIG. 2 shows, in a three-dimensional illustration, an exploded view of a lubricating device 1 of a second exemplary embodiment of the invention, this time from the opposite side, and in this case the side facing away in the illustration of FIG. 2 may assume the same set-up as the lubricating device 1 in FIG. 1. By contrast, the rear side of the housing 2 shows four deflection regions 16 of a rolling body circulation track, which serve for deflecting the rolling bodies in a known way in the ball circulation unit of the guide carriage. In particular, the deflection regions 16 are connected in one piece to the housing 2. An aperture 17 is introduced in each case at the vertex of the deflection radius in the deflection regions 16, which aperture makes a lubricant-conducting connection to the lubricant supply ducts and/or to the repository elements 12a, 12b and/or to the covering regions 11a, 11b and thus implements three-way lubrication. It is possible by means of the apertures 17 to carry out both a supply of lubricant and a discharge of lubricant in the deflection regions 16. In lubricant discharge, excess lubricant supplied to the rolling bodies is stored via the covering region 11a or 11b, respectively in the repository elements 12a, 12b in order to be dispensed at a later time.

Figure 3:
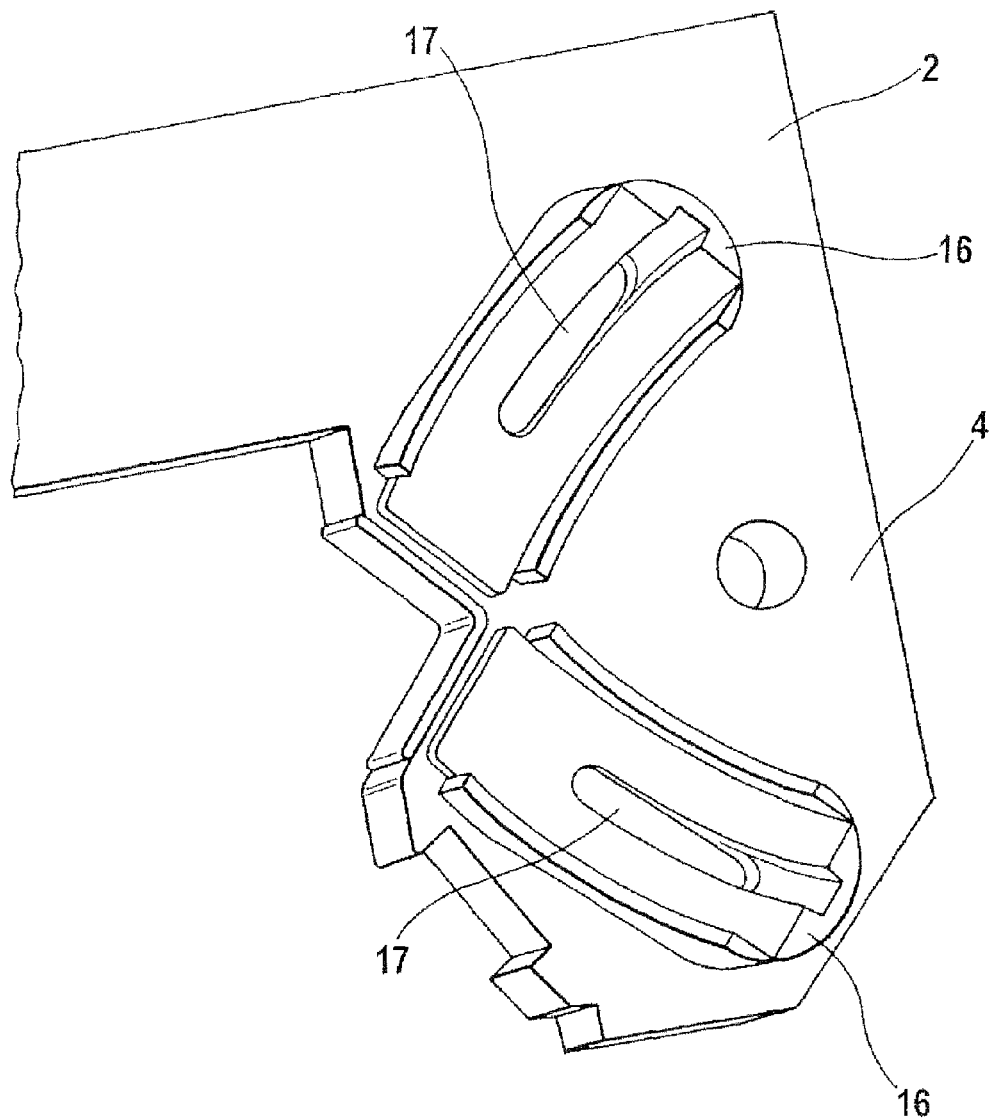
FIG. 3 shows a detail in FIG. 2 in a three-dimensional illustration.

FIG. 3 shows a detail of the housing 2 in the region of the right leg 4 in FIG. 2, in which the deflection regions 16 and the apertures 17 formed in them can once again be seen clearly. Moreover, it can be gathered from the illustration that the formed apertures 17 have an elongate shape.

REFERENCE SYMBOLS

1 Lubricating device
2 Housing
3 Clips
4, 5 Leg
6 Bridge
7 Connecting thread
8a,b Closed lubricant supply duct regions
9a,b Nonreturn valve
10a,b Channels
11a,b Covering region
12a,b Repository element
Noses
14a,b Protective plates
15 Plate
16 Deflection region
17 Aperture

The invention claimed is:

1. A lubricating device for a linear rolling bearing, which has a guide rail and a guide carriage that is displaceable longitudinally on the guide rail and supported on the guide rail via rolling bodies which are guided along the guide rail in longitudinal grooves of the guide rail, the lubricating device fastened to the guide carriage for lubricating the longitudinal grooves and the rolling bodies, the lubricating device comprising:
a housing having lubricant supply ducts that supply a lubricant to the longitudinal grooves and have covering regions and, on an end face of the housing, in a region of the longitudinal grooves, outlet passages for transfer of the lubricant to the longitudinal grooves; and
at least one absorbent repository element,
wherein the lubricant supply ducts are covered laterally in the covering regions by the at least one absorbent repository element, which is designed and arranged to absorb the lubricant in the covering regions and conduct the lubricant, parallel to the lubricant supply ducts, to the longitudinal grooves.

2. The lubricating device of claim 1, wherein the absorbent repository element is formed from porous material, porous synthetic resin, polymer material, sintered material, wick material, microcellular rubber and/or capillary material.

3. The lubricating device of claim 1, wherein the covering regions are contiguous to closed regions of the lubricant supply ducts and extend as open ducts as far as the free outlet passages.

4. The lubricating device of claim 1, wherein the lubricating device two or four free outlet passages.

5. The lubricating device of claim 1, wherein non-return or one-way valves are arranged along the channel of the lubricant supply ducts.

6. The lubricating device of claim 1, further comprising at least, one protective plate, and the repository element is covered, at least in portions, in a longitudinal direction of the guide rail, by the at least one protective plate.

7. The lubricating device of claim 6, wherein the protective plate consists, at least in a marginal region or a contact region with the guide rail, of a material absorbing dirt particles.

8. The lubricating device claim 6, wherein the lubricating device has a plurality of repository elements and a plurality of protective plates arranged varying or alternately.

9. The lubricating device of claim 1, wherein the repository element has a multiple-ply set-up in a longitudinal direction of the guide rail.

10. The lubricating device of claim 1, wherein the lubricating device has a rolling body deflection, which allows an endless circulation of the rolling bodies in the guide carriage, and the rolling body deflection has apertures for the transfer of the lubricant to the rolling bodies.

11. The lubricating device of claim 1, wherein the lubricating device has a yoke-like design and the lubricating device has legs for surrounding the guide rail.

12. The lubricating device of claim 1, wherein the lubricating device has legs and the lubricant supply ducts have a widening in the covering regions, upstream of each of the outlet passages or upstream of the outlet passages of one of the legs of the lubricating device, in order to improve transport of the lubricant between the lubricant supply ducts and the repository element.

13. The lubricating device of claim 1, wherein the covering regions are substantially circular.

14. The lubricating device of claim 1, wherein the repository element has two noses that are triangular as viewed in cross-section.

15. The lubricating device of claim 1, wherein two of the lubricant supply ducts, which are substantially parallel to each other, extend from the covering regions to the end face of the lubricating device.

* * * * *